United States Patent
Stevens

(10) Patent No.: US 7,325,977 B2
(45) Date of Patent: Feb. 5, 2008

(54) OPTICAL COUPLING

(75) Inventor: Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/812,800

(22) Filed: Mar. 30, 2004

(65) Prior Publication Data

US 2005/0220419 A1    Oct. 6, 2005

(51) Int. Cl.
*G02B 6/38* (2006.01)
(52) U.S. Cl. .......................... 385/60; 385/53; 385/55; 385/58; 385/70
(58) Field of Classification Search ............... 385/53, 385/55, 58, 60, 70
See application file for complete search history.

(56) References Cited

U.S. PATENT DOCUMENTS

| | | | | |
|---|---|---|---|---|
| 4,893,889 A | * | 1/1990 | Iwakiri et al. | 385/39 |
| 4,953,941 A | * | 9/1990 | Takahashi | 385/72 |
| 4,953,951 A | * | 9/1990 | Gilbreath et al. | 359/1 |
| 4,989,946 A | * | 2/1991 | Williams et al. | 385/16 |
| 5,039,193 A | * | 8/1991 | Snow et al. | 385/25 |
| 5,136,681 A | * | 8/1992 | Takahashi | 385/140 |
| 6,702,478 B2 | * | 3/2004 | Inagaki et al. | 385/72 |
| 2004/0096178 A1 | * | 5/2004 | Jones et al. | 385/140 |

* cited by examiner

*Primary Examiner*—Frank G. Font
*Assistant Examiner*—Derek L. Dupuis
(74) *Attorney, Agent, or Firm*—Jacobson & Johnson

(57) ABSTRACT

An apparatus and method for coupling and decoupling optical leads while preventing twists or kinks in the optical leas as well as back reflections with the apparatus including an a rotatable optical coupler and a non-rotatable optical coupler.

18 Claims, 3 Drawing Sheets

OPTICAL COUPLING

FIELD OF THE INVENTION

This invention relates generally to coupling and, more specifically, to coupling and decoupling optical leads to each other while minimizing reflections and twisting of the optical leads.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

One of the difficulties in optical coupling of the ends of optical fibers to each other is to avoid or reduce the back reflection at the junction between the ends of two optical fibers.

One of the methods to optically couple two optical fibers, while minimizing back reflections, is to square or dome the ends of two optical fibers and abut the ends against each other and place a gel, or other optical conducting substance, which has an index of refraction that matches the index of refraction of the optical fibers, between the two ends of the optical fibers. Unfortunately, in applications where an optical fiber has to be connected and disconnected the presence of a gel or liquid at the ends of the optical fibers not only hinders the connecting or disconnecting process but it is difficult to retain the optically conducting substance between the ends of the optical leads during the connection and disconnection process. Therefore, a connection and disconnection process using a substance between the ends of the optical fibers, although reducing the back reflection, is generally unsuitable for coupling optical fibers that need to be periodically coupled and decoupled from each other.

Another method to optically couple optical fibers is angle coupling where angle cut faces are placed in a parallel condition to each other. Angle coupling reduces the back reflection between the ends of two optical fibers. In this method one cuts the ends of each of two optical fibers at a "coupling angle" that is a cut across an optical fiber, at an acute angle with the acute angle such that a reflected optical signal from the optical fiber is directed outside the optical fiber to thereby minimize the effects of back reflection. The method of angle cutting the ends of the optical fibers to produce optical fibers each having an optical end face located at a "coupling angle" and then aligning the optical end faces in a parallel condition reduces the back reflection. Unfortunately, angle cutting the ends also requires one to rotate the optical fibers in order to align the optical faces in a parallel condition to each other. This method of angle coupling is effective in reducing back reflections as well as providing a method wherein the optical fibers can be quickly coupled and decoupled since there is no gel or other substance that needs to be maintained between the ends of the optical leads. However, the rotation of the optical leads to produce alignment of the end faces of the optical fibers can introduce twist or kinks into the optical fibers.

In order to rotationally align the optical faces during angle coupling one can key the ends of each of the connectors holding the optical fiber so that when the optical fibers are separated and brought together the angle cut faces of the optical fibers are automatically brought into a parallel condition to each other and thereby reduce the loss of an optical signal transmitted across the junction of the angle cut faces. Unfortunately, rotationally aligning the ends of the connectors by rotating one or the other or both of the optical fibers can introduce unwanted kinks and twists into the optical fibers as one rotates the optical fiber to bring the optical faces into an aligned condition.

The present invention provides a coupling apparatus for optical leads or optical fibers that allows one to quickly couple and decouple an optical lead and at the same time eliminate the problem of twisting of the optical leads as well as the problem of back reflection at the optical junctions. The present invention uses two optical couplers, one optical butt coupler that remains in a coupled but rotatable condition with minimized back reflections, and another angle optical coupler, that can be quickly coupled or decoupled with the butt coupler including a rotation joint that allows rotation of the optical fibers without introducing twists and kinks in the optical leads.

SUMMARY OF THE INVENTION

Briefly, the present invention comprises an optical coupling apparatus and a method of optical coupling two optical fibers to each other where at least one of the optical fibers to be connected to another optical fiber is severed before the terminal end of the optical fiber to form two butt connectable severed ends in the severed optical fiber. One of the severed ends is mounted in one end of a rotational member and the other severed end is mounted in the other end of a rotational member so that when the two rotational members are assembled into a rotational coupler the two severed ends of the severed optical fiber are in optical communication with each other though a rotatable butt connection. To reduce the back reflection between the butt connectable severed ends an optical conductive substance having an index of refraction matching the index of refraction of the optical fibers is placed between the two severed ends of the optical fiber. The severed ends of the optical fiber, which are in a butt connecting condition with respect to each other are thus in a condition to rotate with respect to one another without a degradation of the optical signal therebetween. Thus twist or kinks to the optical fiber are avoided since the rotatable coupling element allows the optical leads to rotate without twisting.

In order to provide for coupling and decoupling of the optical leads an angle coupler is formed by severing the optical fibers at an acute angle to produce angle cut terminal ends such that any back reflection therefrom falls outside of a optical coupling area between the two severed ends of the optical fibers. In order to rotationally orientate the angle cut terminal ends of the optical fibers an alignment guide is placed on the ends of each of the two optical fibers to allow an operator to rotationally align the angle cut faces of the optical fibers with each other. Thus the presence of the rotational coupler on at least one of the optical fibers allows one to rotate the optical lead without introducing kinks or twists and at the same time maintain the integrity of the optical connection through the optical fibers while the angle cut face alignment coupler allows one to quickly couple or decouple the optical fiber while minimizing back reflections.

DESCRIPTION OF THE PREFERRED EMBODIMENT

Figure 1A:
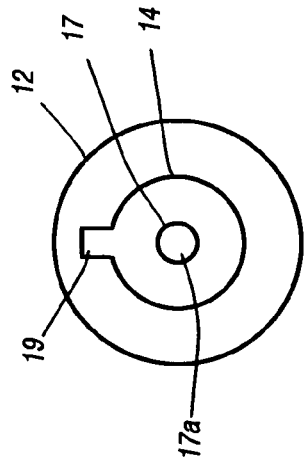
FIG. 1A is an end view of the coupler of FIG. 1.
Figure 1:
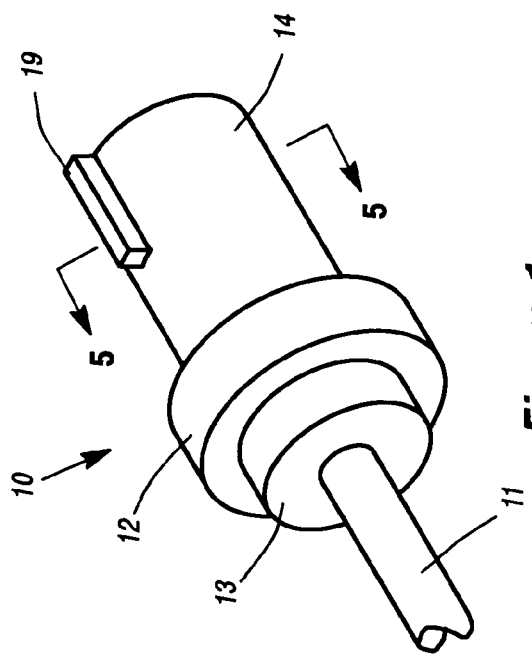
FIG. 1 is a perspective view of a coupler for optically coupling an optical fiber to another optical fiber.
Figure 2:
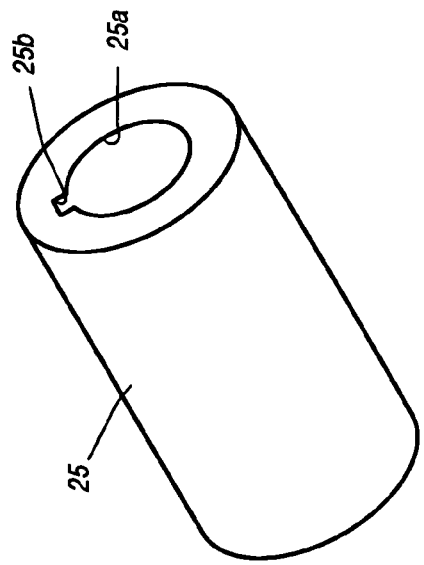
FIG. 2 is a perspective view of an alignment collar.
Figure 3:
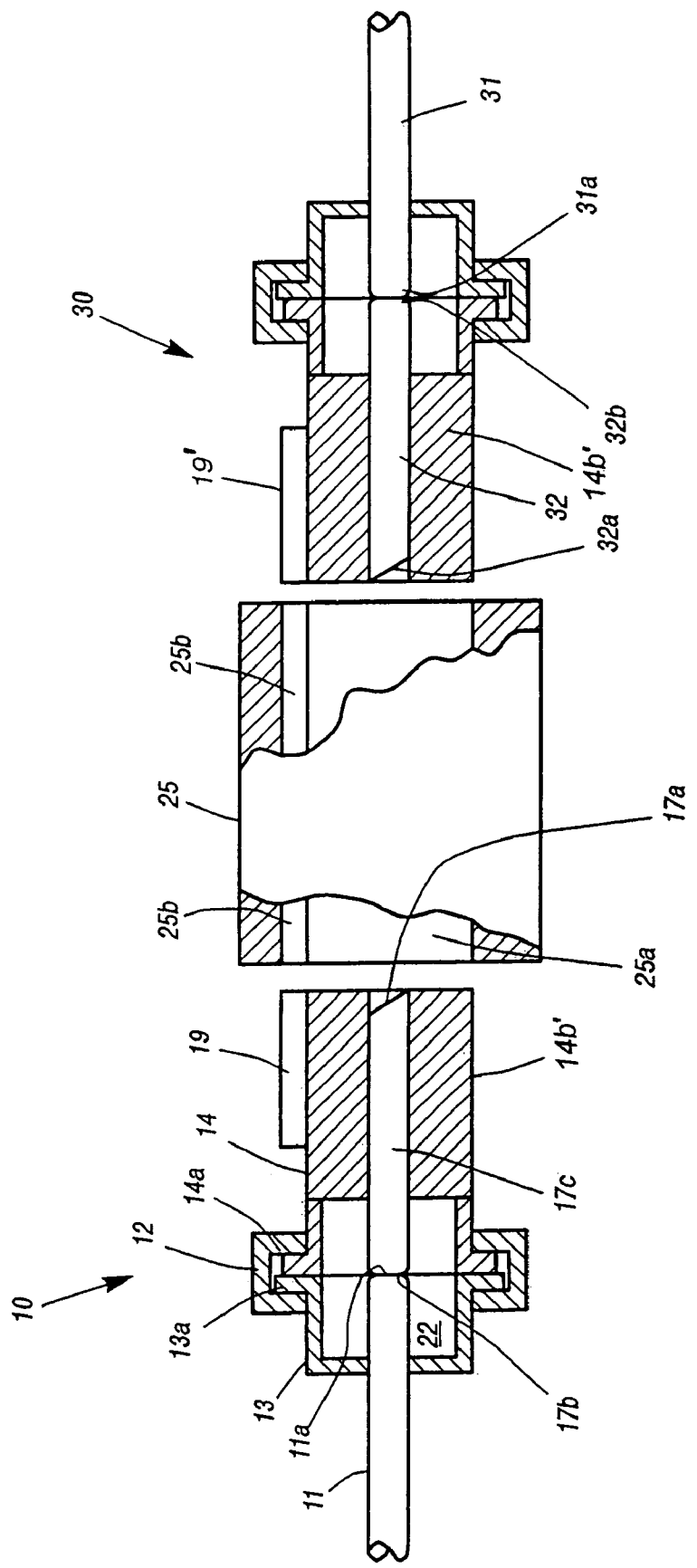
FIG. 3 is a partial cross sectional view showing two optical connectors in a prearranged condition.

Referring to FIG. 1 and FIG. 3, reference numeral 10 identifies a three part rotatable coupling connector or rotatable coupler secured having one end secured to an optical lead or optical fiber 11. The rotatable coupler 10 includes a first flanged member 13 secured to the exterior surface of optical lead 11 and a second flanged member 14 located in a rotational relationship with respect to flanged member 13. Flanged members 13 and 14 are held in rotational engagement and alignment with each other by a U-shaped collar 12 that encompasses the flanges of members 13 and 14. A reference to FIG. 3 shows the flanges 13a and 14a of the flanged members 13 and 14 of coupling connector 10 held in rotational engagement by collar 12 to form a rotational joint.

FIG. 3 shows two identical rotatable couplers 10 and 30 in a condition for optically coupling optical fibers from two different sources. In the embodiment shown coupler 10 is shown in cross sectional view revealing flange 13a and flange 14a that are held in a face to face or an abutting condition by a U-shaped collar 12 to permit rotation of member 14 with respect to member 13. The optical lead 11 is fixed in member 13 and includes a butt connectable terminus or end 11a proximate a butt connectable terminus or end 17b. By butt connectable terminal or end it is meant that the terminal ends have an end face that can transmit an optical signal from one optical fiber to another optical fiber to form a butt coupled joint. To reduce the back reflection, an optical transmitting substance, which has an index of refraction that is substantially the same as the index of refraction of the optical leads 11 and 17 is located between and surrounds the optical leads 11 and 17. The presence of the optical conducting substance 22 that matches the index of refraction of optical leads proximate the ends 11a and 17b reduces the optical reflections thereby providing an optical path from one optical lead 11 to the other optical lead 17 or vice versa with a minimum of back reflections.

Thus a feature of coupler 10 is that the member 14 is rotatable with respect to member 13 without disrupting the optical path from optical lead 11 to optical lead 17 while at the same time inhibiting or reducing back reflections. Coupler 10 also includes a rotational alignment member or elongated key 19 which extends axially along member 14.

Positioned proximate to coupler 10 is an alignment sleeve 25 which is shown partially in section. Alignment sleeve 25 has a lumen therein for receiving flanged member 14 and an inner surface 25a that mates with outer surface 14b of member 14 to coaxially align member 14 within alignment sleeve 25. Alignment sleeve 25 includes an alignment recess 25b that extends in an axial direction from end-to-end of alignment sleeve 25. The alignment recess 25b forms mating engagement with alignment guide 19 to prevent rotation of member 14 with respect to alignment sleeve 25. Similarly an alignment guide 19' on coupler 30 prevents rotation of member 14b' with respect to alignment sleeve 25. Thus member 19, member 19' and alignment sleeve 25 form a non-rotational coupler that maintains the angle cut end faces 17a and 32a in optical alignment with each other.

FIG. 1A shows an end view of member 14 having a centrally located optical fiber 17 having an exposed optical angle cut face 17a forming a coupleable end. Optical fiber 17 is fixedly held in member 14 with member 14 having an axially extending alignment member 19 extending radially outward to from a rotational reference guide.

Figure 5:
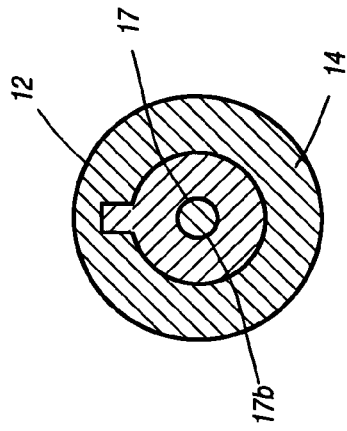
FIG. 5 shows a sectional view taken along lines 5-5 of FIG. 1.

FIG. 5 shows a cross sectional view taken along lines 5-5 of coupler showing optical fiber 17 having an outer surface 17c which is secured to member 14 to prevent rotation of optical fiber 17 with respect to member 14. Thus while optical fiber 11 is fixed with respect to member 13 and optical fiber 17 is fixed with respect to member 14 the optical fibers 17 and 14 are rotateable with respect to each other through the rotational relationship of member 13 to member 14.

In the embodiment shown in FIG. 3 a second identical optical coupler 30 is shown in cross section positioned proximate the opposite end of alignment sleeve 25. A first optical fiber 31 is rotationally coupled to a second optical fiber 32 through optical coupler 30, which is identical to optical coupler 10, to permit transmission of an optical signal from optical lead 31 to optical lead 32 through a butt coupled junction of optical faces 32b and 31a.

As can be seen in FIG. 3 coupler 10 and 30 both carry alignment guides (19, 19') which can be brought into the alignment recess 25b by bringing the ends of coupler 10 and 30 toward each other in alignment sleeve 25. The alignment sleeve 25 allows the angle cut faces 17a and 32a, which are angle coupleable end faces, to be automatically brought into a parallel relationship, and hence a back reflection inhibiting condition, with each other by merely inserting the end of couplers 10 and 30 into the alignment sleeve 25 and bringing the ends of the couplers into proximity with each other.

Figure 4:
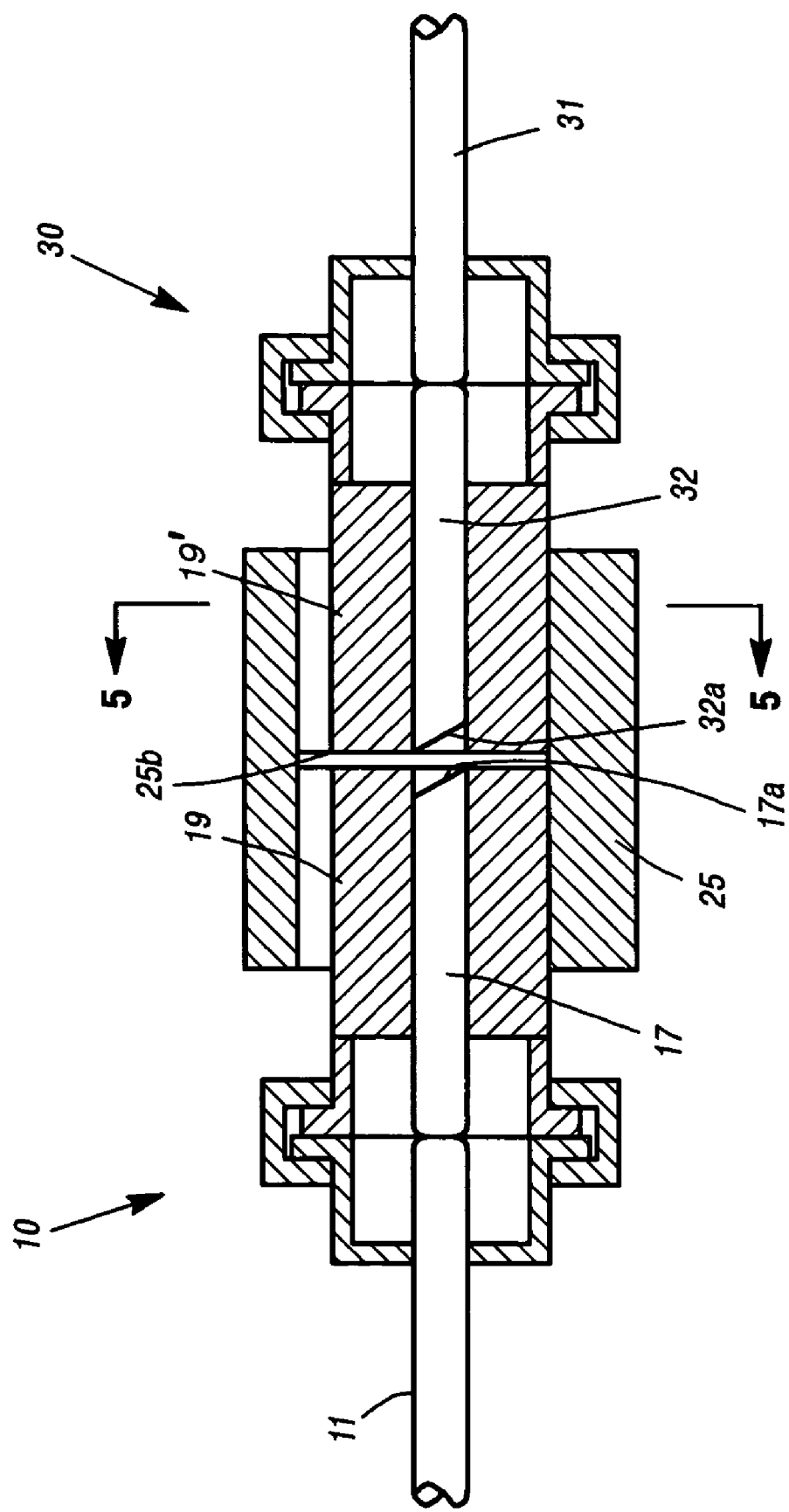
FIG. 4 shows the two optical connectors of FIG. 3 in an optical transmission mode.

FIG. 4 shows the coupler 10 and coupler 30 located in an optically coupled end-to-end condition while held in rotational alignment with each other by the alignment sleeve 25. In this condition the optical angle cut face 17a and the optical angle cut face 32a are in a parallel or substantial parallel condition so as to transmit optical signals from end angle cut face 17a to end angle cut face 32a or vice versa. In the embodiment shown the angle end faces 17a and 32a are separated by a gap; however, since the optical faces are at a coupling angle the optical signal can be transmitted from one optical lead to the other optical lead with a minimum of back reflection. The optical angle cut faces 17a and 32a are referred herein as a "coupling angle cut face". A coupling angle cut face as referred herein refers to the an angle cut across an optical fiber with the angle of the cut such that a reflected optical signal within the optical fiber is reflected outside the optical fiber so as not to interfere with transmission of optical signals between the two coupling angle cut faces with the angle dependent on the characteristics of the optical fibers.

While two rotational optical couplers 10 and 30 are shown for rotational connection of optical fiber 11 to optical fiber 31, a single rotational optical coupler can be used to provide an optical connection and at the same allow one to alleviate any kinks or twists in the optical leads since a single rotatable coupler can alleviate the twist or kinks in two optically connected fibers.

Thus, in the present invention one can quickly couple and decouple two optical leads to each other while at the same time inhibiting back reflections as well as eliminating kinks or twists in either of the optical leads.

I claim:

1. A three part rotateable coupling connector comprising:
an alignment mounting sleeve;
a first optical coupler mounted to the alignment sleeve, the first optical coupler having a first optical fiber and a second optical fiber, the second optical fiber rotatably mounted with respect to the first optical fiber with an end of the first optical fiber positionable proximate an end of the second optical fiber to permit transfer of an optical signal between the first optical fiber and the second optical fiber while permitting rotation thereof; and
a second optical coupler mounted in the alignment sleeve, the second optical coupler having a third optical fiber and a fourth optical fiber, the fourth optical fiber rotatably mounted with respect to the third optical fiber with an end of the third optical fiber positionable proximate an end of the fourth optical fiber to permit transfer of an optical signal between the third optical fiber and the fourth optical fiber while permitting rotation thereof.

2. The three part rotateable coupling connector of claim 1 wherein an optical conducting substance having an index of refraction matching an index of refraction of the first optical fiber and the second optical fiber is located proximate the end of the first optical fiber and the end of the second optical fiber.

3. The three part rotateable coupling connector of claim 1 including an alignment guide located on the first optical coupler.

4. The three part rotateable coupling connector of claim 1 including a flanged member directly holding the first optical fiber and a rotateable member comprising a further flanged member directly holding the second optical fiber.

5. The three part rotateable coupling connector of claim 4 wherein a U-shaped member holds the flanged member and the further flanged member in rotational engagement with each other.

6. The three part rotateable coupling connector of claim 1 wherein at least one of the optical fibers includes an angle cut face.

7. The three part rotateable coupling connector of claim 1 wherein the end of the first optical fiber and the end of the second optical fiber form a butt connection.

8. The three part rotateable coupling connector of claim 1 wherein the second optical fiber includes an angle cut face.

9. An apparatus for optical coupling and optical decoupling comprising:
a first optical fiber having an angle cut terminus;
a rotational joint located on an end of the first optical fiber;
a second optical fiber having an angle cut terminus with the angle cut terminus of the first optical fiber and the angle cut of second optical fiber positionable in optically transmittable condition with each other to minimize back reflections;
a third optical fiber forming the rotational joint with the end of the first optical fiber;
a fourth optical fiber in optical communication with the second optical fiber and
an alignment sleeve for holding the angle cut terminus of the first optical fiber and the angle cut terminus of the second optical fiber in rotational alignment with respect to each other.

10. The apparatus of claim 9 with the rotational joint having a member with an alignment guide thereon.

11. The apparatus of claim 9 wherein the end of the first optical fiber includes a butt connectable.

12. The apparatus of claim 11 wherein an optically conducting substance having an index of refraction matching an index of refraction of the first optical fiber proximate the butt connectable end in the rotational joint.

13. An apparatus for optical coupling and decoupling comprising:
a first optical lead having a butt connectable end;
a first member holding the first optical lead;
a third optical lead having a butt connectable end;
a second member holding the butt connectable end of the third optical lead in rotational relationship with respect to the butt connectable end of the first optical lead; the first optical lead having an angle cut end face to allow passage of an optical signal through the angle cut end face;
a second optical lead having a butt connectable end;
a third member holding the second optical lead;
a fourth optical lead having a butt connectable end;
a fourth member holding the butt connectable end of the fourth optical lead in rotational relationship with respect to the butt connectable end of the second optical lead;
the second optical lead having an angle cut end face to allow passage of an optical signal through the angle cut end face; and
a transparent substance extending between the butt connectable end of the first optical lead and the butt connectable end of the second optical lead with the transparent substance having an index of refraction substantially equal to an index of refraction of the first optical lead and the second optical lead to thereby inhibit loss of an optical signal therebetween while permitting rotation thereof.

14. A method of twist free optical coupling comprising:
forming a rotational butt coupled joint in between a third optical lead and a first optical lead having a terminus;
forming a coupling angle cut face on the terminus of the first optical lead;
forming a mating coupling angle cut face on the terminus of a second optical lead
forming a rotational butt coupled joint between the second optical lead and a fourth optical lead; and
rotationally aligning the coupling angle cut face on the terminus of the first optical lead with the mating coupling angle cut face to thereby transmit an optical signal therebetween while minimizing back reflection and twisting of the first optical lead.

15. The method of claim 14 including the step of placing an optically conducting substance having an index of refraction matching an index of refraction of the optical leads in the butt coupled joint.

16. The method of claim 14 including the step of using an alignment sleeve to rotationally align the coupling angle cut face and the mating coupling angle cut face.

17. The method of claim 16 including the step of using an alignment guide in cooperation with the alignment sleeve to align the coupling angle cut face and the mating coupling angle cut face.

18. The method of claim 17 including the step of placing a rotational joint in another optical lead.

* * * * *